H. B. PAGE
INDICATOR.
APPLICATION FILED MAR. 17, 1916.

1,290,648.

Patented Jan. 7, 1919.
2 SHEETS—SHEET 1.

Inventor
H. B. Page,
By Victor J. Evans
Attorney

Witnesses

H. B. PAGE.
INDICATOR.
APPLICATION FILED MAR. 17, 1916.
1,290,648.
Patented Jan. 7, 1919.
2 SHEETS—SHEET 2.
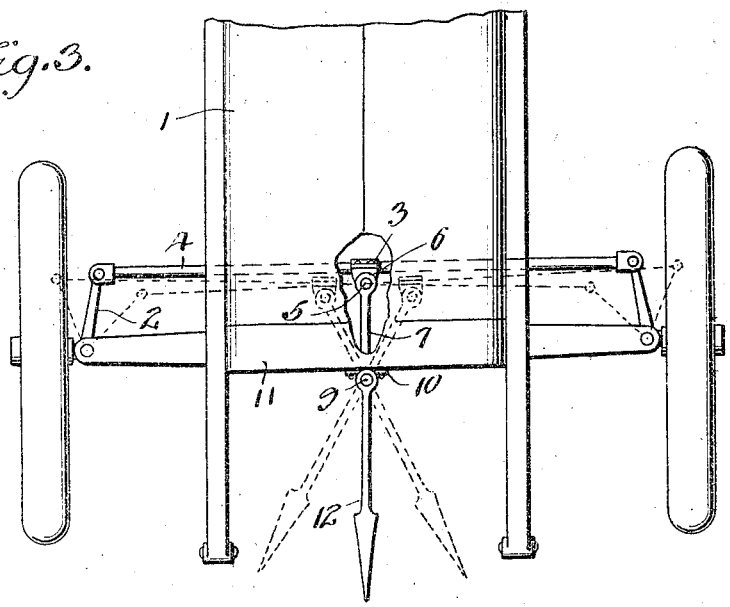
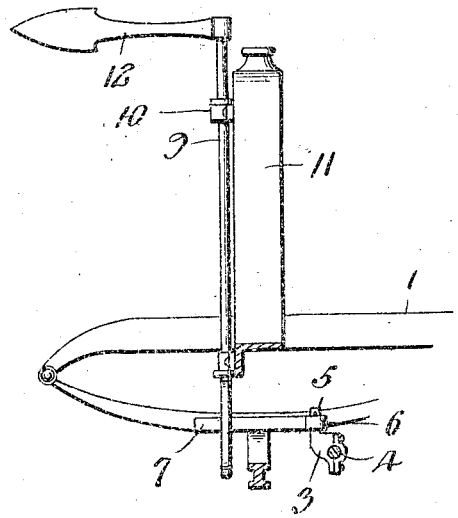
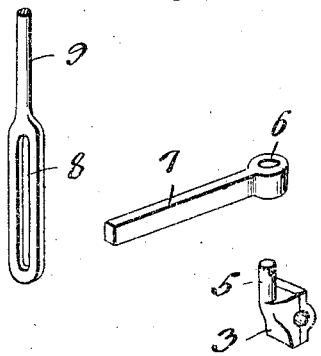
Inventor
H. B. Page,
By Victor J. Evans
Attorney
Witnesses

UNITED STATES PATENT OFFICE.

HENRY B. PAGE, OF BOYLE, MISSISSIPPI.

INDICATOR.

1,290,648.  Specification of Letters Patent.  Patented Jan. 7, 1919.

Application filed March 17, 1916. Serial No. 84,872.

*To all whom it may concern:*

Be it known that I, HENRY B. PAGE, a citizen of the United States, residing at Boyle, in the county of Bolivar and State of Mississippi, have invented new and useful Improvements in Indicators, of which the following is a specification.

This invention relates and has for its primary object to provide an indicator by means of which the driver of a vehicle in his seat may be given visible indication as to the position of the front wheels.

An object of the invention is to provide a construction so connected to the front wheels of a vehicle as to move in unison with the front wheels, thus insuring the proper relation between the indicator and the front wheels of the vehicle.

Another object of the invention is to provide a construction of the character set forth in which the vibratory motion of the vehicle on its springs may be properly taken care of.

With these and other objects in view the invention consists in the construction, combination and arrangement of parts as will be hereinafter more fully described, illustrated in the accompanying drawing and pointed out in the claim hereunto appended.

In the drawing:—

Fig. 3 is an enlarged top plan view of portions of the automobile showing the indicator in its normal position with its other two positions illustrated in dotted lines.

Fig. 4 is an enlarged vertical section through portions of the vehicle showing my invention in side elevation.

Fig. 5 is a detail view showing a portion of my invention disconnected.

Figure 1:
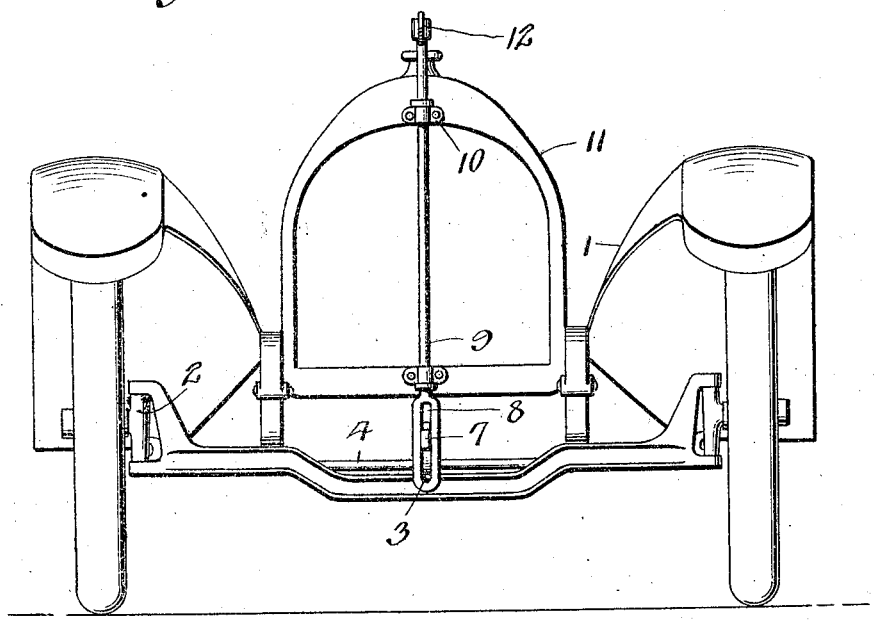
Figure 1 is a front view of an automobile showing the invention applied thereto.
Figure 2:
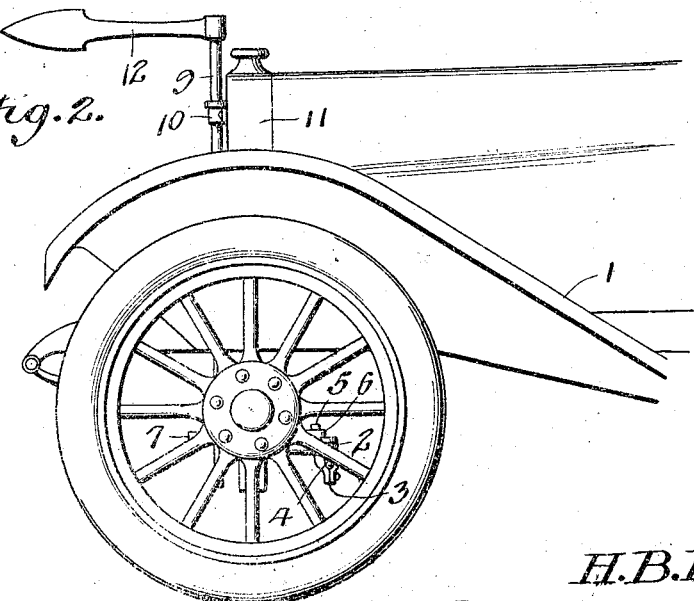
Fig. 2 is a side elevation of the automobile.

In the drawing the numeral 1 designates the body of a well known form of automobile to which usual steering mechanism 2 is attached by which the front wheels may be turned upon the knuckles by the operator in the machine. My invention comprises a clip 3 attached to the intermediate portion of the knuckle-connecting rod 4 of the steering mechanism 2. This clip 3 is formed with a cylindrical pin 5 shown in this particular instance as extending vertically. Engaging the same is an eye 6 at the rear end of a finger 7, the latter having its remaining extremity slidably mounted in an upright slot 8 formed in the lower end of a vertically arranged shaft 9. This shaft 9 is rotatably mounted in a bracket 10 secured to the radiator 11 of the vehicle. The upper end of the shaft 9 projects a predetermined distance above the radiator and has secured thereto one end of an indicating arm 12 such arm to have any configuration found advantageous in practice.

In the act of connecting the vehicle the steering rod 4 is moved in proportion to the turning of the wheels and this movement is transmitted to the indicating arm 12 in the same ratio through the mechanism described and in view of the fact that the indicating arm 12 occupies a position visible from the driver's seat visible indication will be given as to the angle in which the steering wheels are arranged. Attention at this point is called to the fact that the engagement between the slot 8 and one end of the finger is such as to allow the vibratory action between the axle and the body of the vehicle to be properly taken care of without in any way bringing to bear upon the apparatus any undue strain.

From the foregoing description taken in connection with the accompanying drawing it should be apparent that I provide a device which is admirably adapted for the purpose for which it is intended, that the device is simple, durable and efficient of construction and that the device may be manufactured and sold at a comparatively low cost.

What I claim is:—

In a device for indicating the position of the steering wheels of an automobile, the combination with a clip adapted to be attached to the knuckle-connecting rod and having an upstanding pin, and a finger having an eye at its rear end mounted on said pin; of bearings carried by the automobile structure above the springs thereof, and an upright shaft mounted in said bearings and having an indicating arm at its upper end and a longitudinal slot at its lower end loosely receiving said finger, for the purpose set forth.

In testimony whereof I affix my signature in presence of two witnesses.

HENRY B. PAGE.

Witnesses:
 J. H. CAPSHAW,
 F. L. GILLEY.